United States Patent [19]

Nakamuta

[11] Patent Number: 4,534,283

[45] Date of Patent: Aug. 13, 1985

[54] METHOD AND APPARATUS FOR MANUFACTURING BEAN CURD

[76] Inventor: Masamichi Nakamuta, 320, Arii, Shonai-machi, Kaho County, Fukuoka Prefectur, Japan

[21] Appl. No.: 490,800

[22] Filed: May 2, 1983

[30] Foreign Application Priority Data

May 6, 1982 [JP] Japan .................................. 57-77364
May 7, 1982 [JP] Japan .................................. 57-67104[U]

[51] Int. Cl.³ .............................................. A23J 1/00
[52] U.S. Cl. ....................................... 99/468; 99/474; 99/483; 99/486; 99/516
[58] Field of Search ................. 99/452, 453, 455, 467, 99/468, 470, 471, 473–475, 483, 493, 486, 487, 516, 517, 534, 536; 366/101, 106, 107; 426/629, 632, 520, 521, 523; 126/369

[56] References Cited

U.S. PATENT DOCUMENTS

| | | | |
|---|---|---|---|
| 3,143,428 | 8/1964 | Reimers et al. | 99/470 X |
| 3,754,466 | 8/1973 | Taralli et al. | 99/516 X |
| 4,254,698 | 3/1981 | Savarese | 99/486 X |
| 4,302,111 | 11/1981 | Harris | 99/483 X |
| 4,390,350 | 6/1983 | Palm | 99/453 X |

Primary Examiner—Timothy F. Simone

[57] ABSTRACT

A method and an apparatus for manufacturing bean curd is disclosed wherein the slurry which comprises milled soybeans which is obtained by grinding the soybeans after they have been dipped in water for about 12 hours and added water is heated in a vessel as the preparatory process for manufacturing the bean curd in two steps, i.e. in the first step the slurry is boiled by directly injecting into it in a sufficient amount, and in the second step the boiled slurry is succeedingly steamed by steam directly injected into the slurry, but in a reduced amount or indirectly heated through the vessel by steam, decreasing the destruction of the soybean protein and increasing the yield of the product.

11 Claims, 20 Drawing Figures

METHOD AND APPARATUS FOR MANUFACTURING BEAN CURD

BACKGROUND OF THE INVENTION

The present invention relates to bean curd or tofu, and more particularly to an improvement in a method and an apparatus for manufacturing bean curd.

As wellknown in the art bean curd or tofu is usually industrially manufactured as follows:

Soybeans are first dipped in water for about 12 hours, and they are then ground to pasty state by e.g. a mill resulting in one kind of a slurry, i.e. so-callled "go" in accordance with the Japanese term. Thereafter, the slurry or "go" is heated with water being added thereto, and the heated slurry is squeezed while it is hot so that soybean milk is obtained, with the insolubles being separated out. When the soybean milk is cooled to a temperature of about 70° C. calcium sulphate ($CaSO_4$) as a coagulating agent is added thereto as an aqueous solution in a ratio of 2 to 3 wt % of the amount of the soybeans so that the protein contained in the soybean milk is coagulated. After completion of the coagulation, which usually takes about 10 minutes from the addition of the coagulating agent, the supernatant liquid is discarded and the coagulated substance is transferred into an open-topped rectangular box having a considerable depth which has the side walls and the bottom all appropriately formed with a number of small through holes, and which has its inner periphery previously covered entirely with cloth. After transfer, a weight is applied over the whole surface of the milk so that the water is discharged out of the box through the cloth and the through-holes, leaving the bean curd within the box.

Among the above processes the heating of the slurry has been usually carried out such that it is poured into an open-topped vessel and boiled therein from the beginning to the completion throughout by directly injecting heating steam into the slurry in a sufficient amount thereof. This makes it impossible to produce bean curd rich in protein, because such a conventional boiling process often destroys the soybean protein, and also deteriorates the yield of the bean curd, decreasing the rigidity, luster, fineness of grain, etc. of the product.

SUMMARY OF THE INVENTION

It is an object of the present invention to provide a method for manufacturing bean curd which can eliminate the defects in the conventional manufacturing method as described above.

It is another object of the present invention to provide a method for manufacturing bean curd which allows the heating of the slurry without an excessive loss of soybean protein during the heating.

It is a further object of the present invention to provide a method for manufacturing bean curd which can prevent the destruction of the soybean protein during the heating of the slurry, increasing the yield of the product.

It is a still further object of the present invention to provide a method for manufacturing bean curd which makes it possible to produce bean curd having rigidity, luster, a fine grain, etc.

It is a yet further object of the present invention to provide a method for manufacturing bean curd which allows the slurry to be coagulated using less coagulating agent, accordingly descreasing the bitterness of the product.

It is also an object of the present invention to provide an apparatus to carry out the method in accordance with the present invention.

It is another object of the present invention to provide an apparatus for manufacturing bean curd which allows the heating of the slurry with reduced heating energy and with the generation of bubbles being suppressed, decreasing the use of an anti-foaming agent, resulting in preventing the inclusion of bubbles into the product.

In accordance with the present invention a method for manufacturing bean curd is provided wherein the heating of the slurry takes place in two steps, i.e. in the first step it is directly heated in a vessel by injecting steam therein with or without indirectly heating it through the wall of the vessel by outside steam, and in the second step the slurry is heated in the vessel indirectly by the heat conducted through the wall of the vessel from the outside and/or by the heating within the vessel with steam at a reduced rate.

In accordance with the present invention an apparatus for manufacturing bean curd is provided wherein an open-topped vessel is provided for heating the slurry therein, the outer periphery of the vessel being partially, particularly at the lower portion thereof, surrounded by an outer wall to form a heating chamber therebetween, and a steam injection means is provided within the vessel at its lower part, other steam being adapted to be supplied into the heating chamber, whereby the supply of the steam to the injection means and to the heating chamber is arranged so that it can be independently regulated as desired.

BRIEF DESCRIPTION OF THE DRAWINGS

These and other objects as well as the advantages of the present invention will become apparent from the following description taken in conjunction with the accompanying drawings wherein are set forth by way of illustration and example certain embodiments of the present invention.

DESCRIPTION OF THE PREFERRED EMBODIMENTS

Figure 1:
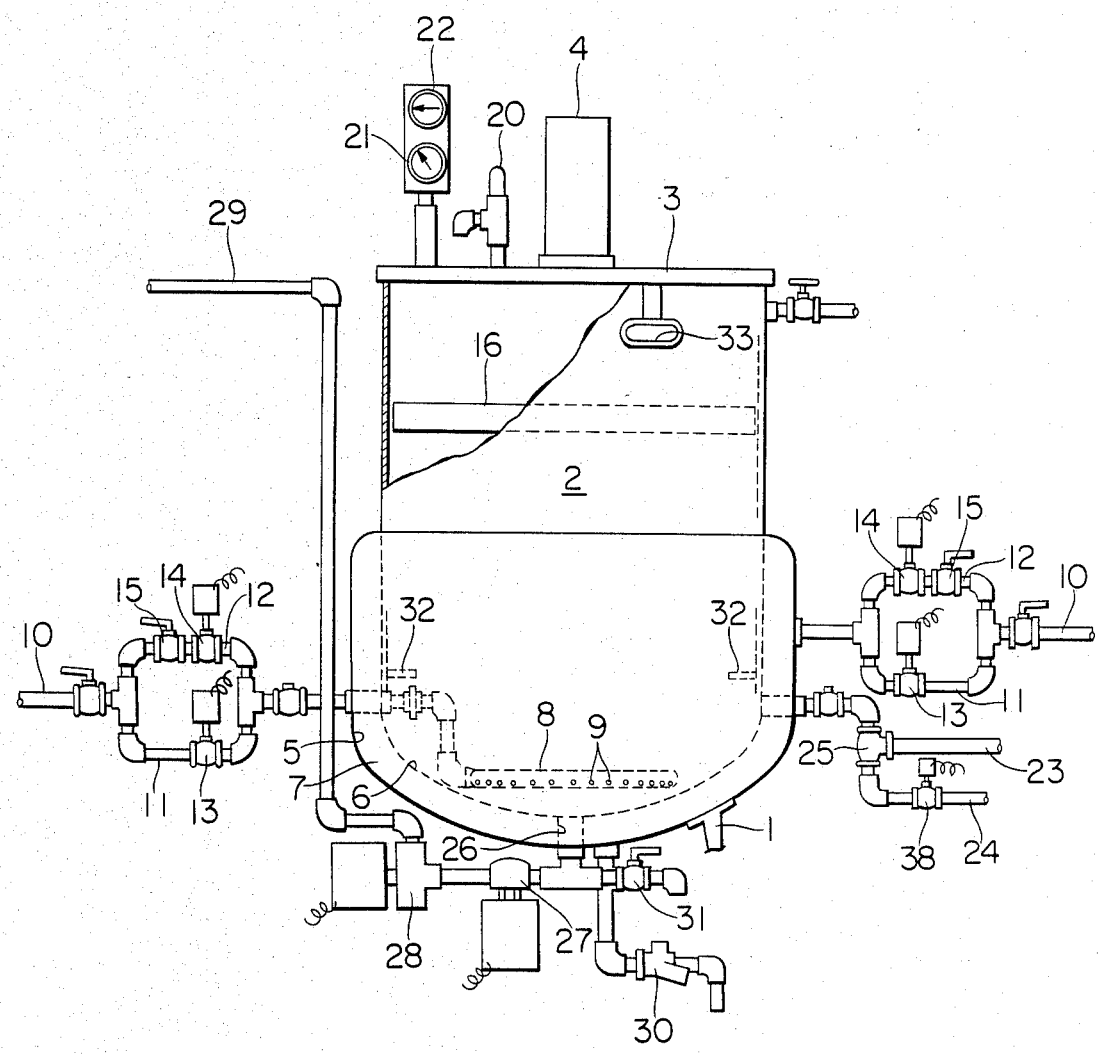
FIG. 1 is a front elevational view, partially broken, of one embodiment of the present invention.
Figure 4:
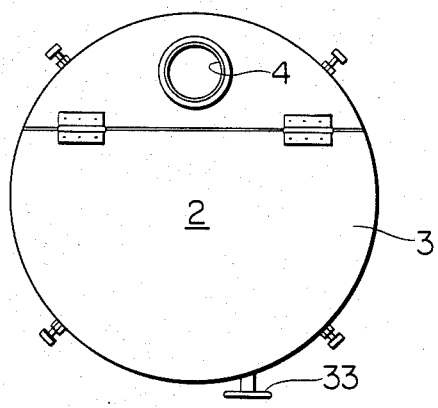
FIG. 4 is a plan view of the apparatus shown in FIG. 1.

Referring now to FIG. 1 of the attached drawings wherein is shown a first embodiment of the present invention, a vertical boiling vessel 2 is mounted on a foundation frame 1, a cover plate 3 having generally a circular shape closing the open top end of vessel 2, cover plate 3 being separated along a cord so as to appear as two parts having a different dimension, whereby the one having a smaller dimension is fixedly secured to vessel 2 and the one having a larger dimension is hinged to the former along the chord, and on the part having a smaller dimension is sealingly secured an upstanding open-topped cylinder 4. See FIG. 4.

Figure 5:
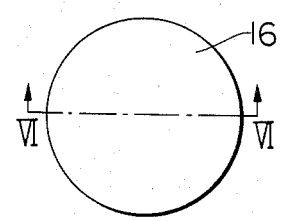
FIG. 5 is a plan view of the floating disc shown in FIG. 1.
Figure 6:
FIG. 6 is a sectional view of the floating disc shown in FIG. 5 taken along the line VI—VI of FIG. 5.
Figure 7:
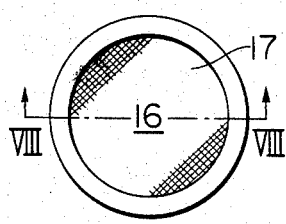
FIG. 7 is a plan view of a variation of the floating disc shown in FIGS. 5 and 6.
Figure 9:
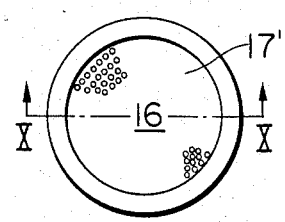
FIG. 9 is a plan view of another variation of the floating disc shown in FIGS. 5 and 6.
Figure 11:
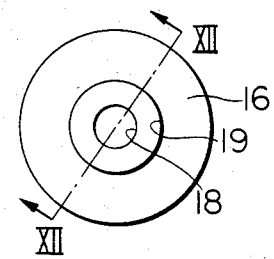
FIG. 11 is a further variation of the floating disc shown in FIGS. 5 and 6.
Figure 8:
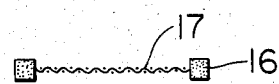
FIG. 8 is a sectional view of the floating disc shown in FIG. 7 taken along the line VIII—VIII of FIG. 7.
Figure 10:
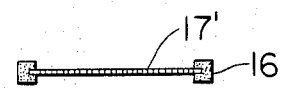
FIG. 10 is a sectional view of the floating disc shown in FIG. 9 taken along the line X—X of FIG. 9.
Figure 12:
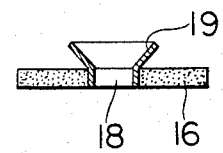
FIG. 12 is a sectional view of the floating disc shown in FIG. 11 taken along the line XII—XII of FIG. 11.

The lower outer periphery of vessel 2 is surrounded by an outer wall 5 at a distance so that a heating chamber 7 is formed between it and the bottom portion 6 of vessel 2. Thus, outer wall 5 and the bottom portion 6 constitue a double bottom for vessel 2. An annular heating steam supply pipe 8 is arranged horizontally within vessel 2 above bottom portion 6, said pipe 8 provided with a number of steam nozzles 9, each directed obliquely downwards. Steam pipes 10 leading to heating chamber 7 and steam supply pipe 8 are each provided with parallel pipes 11 and 12, each pipe being respectively provided with a solenoid valve 13 or 14, and at least pipe 12 of the two pipes 11, 12 is additionally provided with a flow regulating valve 15. Alternatively, it may be possible to manually operate solenoid valve 14 by the combined use of flow regulating valve 15. Within vessel 2 is a floating disc 16 mounted so as to be freely movable up and down following the level of the slurry contained in vessel 2. As shown in FIGS. 5 and 6 floating disc 16 is constituted as a hollow, float circular disc. Alternatively, it may have the form of a circular disc with a central mesh 17 or a central perforation 17′ as shown in FIGS. 7 and 8 or FIGS. 9 and 10 at 16, or as shown in FIGS. 11 and 12 it may be a circular disc 16 with a central funnel 19 on its upper surface for supplying the slurry therethrough. Further, in FIG. 1 the reference numeral 20 shows a safety valve, 21 is a pressure gauge, 22 is a thermometer, all being provided on cover plate 3, 23 is a supply pipe for the slurry opened to vessel 2 at its lower portion, slurry supply pipe 23 being connected to a slurry accumulation tank not shown, 24 is a steam pipe connected to slurry supply pipe 23 so as to constitute an ejector therein, 26 is a heated slurry discharge orfice opened in bottom 5 of vessel 2 centrally thereof, 27 is a motor-driven valve for discharging the heated slurry in communication with discharge orifice 26, 28 is a pump for conveying the heated slurry in communication with motor-driven valve 27, 29 is a discharge pipe for the heated slurry to convey it to a next station, 30 is a steam trap connected to steam chamber 7 via a pipe, 31 is a rinse water discharge cock connected to boiled slurry discharge orifice 26, 32 are rest fittings secured to the inside of vessel 2 at the lower part to rest thereon floating disc 16, 33 is a handle secured to the larger dimension part of cover 3 at its peripheral portion.

Figure 2:
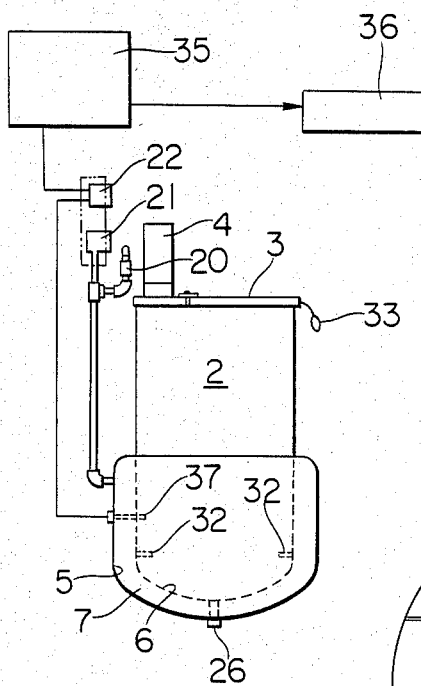
FIG. 2 is a diagrammatical view of the apparatus shown in FIG. 1, illustrating the control system therefor.
Figure 3:
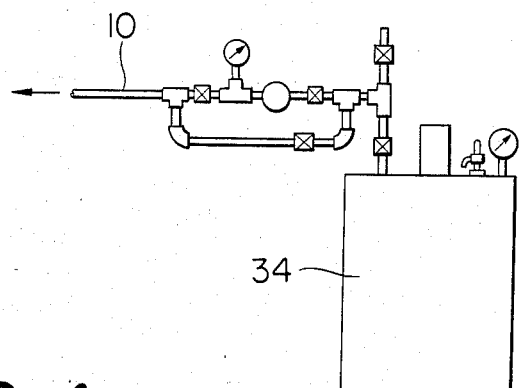
FIG. 3 is a front elevational view of a boiler to be used in association with the apparatus shown in FIG. 1.

A boiler 34 is separately provided for supplying steam to vessel 2. See FIG. 3. Further, as shown in FIG. 2 a control panel 35 is provided in cooperation with pressure gauge 21 and thermometer 22, 36 representing solenoid valves 13, 14, and motor-driven valve, 27 and also connected to panel 35 is a temperature sensor 37 which is located within vessel 2 above fittings 32.

The manner of operation of the apparatus described above and shown in FIGS. 1 to 12 is as follows:

Assuming that boiler 34 is fired to generate steam to supply it to vessel 2, etc. through pipes 10 and 24. Firstly, when solenoid valve 38 is opened to supply the steam from boiler 34 through pipe 24 to ejector 25 it operates to eject the steam into raw slurry supply pipe 23, thereby the raw slurry is injected into vessel 2 by the steam ejection action. When the raw slurry is filled within vessel 2 to a predetermined level solenoid valve 38 is closed, and also raising floating disc 16 which floats on top of the rising raw slurry. At this state, on one hand, in connection with vessel 2 valve 13 of one of the parallel pipes 11 is opened, whereas valve 14 of the other of parallel pipes 12 is closed so that the steam is supplied into vessel 2 from pipe 10 via pipe 11, and on the other hand, in connection with heating chamber 7, steam chamber 7 is at the same time filled with steam under pressure similarly supplied from steam pipe 10 through another set of valves, i.e. one valve 13 being opened with the other walve 14 being closed. Thus, the raw slurry within vessel 2 is directly boiled by the steam injected through nozzles 9 of annular steam supply pipe 8 and at same time indirectly heated through the wall of vessel 2 by the surrounding heating chamber 7. In this case, the heating temperature is 100° C. or thereabouts and the raw slurry is boiled at this temperature. The bubbles from the boiling of the slurry are suppressed by floating disc 16, preventing boil over and consequently preventing the loss of bean protein. Thus, after a predetermined time the first step is completed.

Upon completion of the first step, in connection with both vessel 2 and heating chamber 7 valve 13 of one of parallel pipes 11 is closed, valve 14 of the other of parallel pipes 12 is opened, whereby flow regulating valve 15 of one of parallel pipes 12 is throttled so that about one tenth of the heating steam which has been supplied through the other of parallel pipes 11 is supplied within vessel 2 and heating chamber 7 through valve 15 so that the slurry within vessel 2 is steamed by steam supply pipe 8 and steam chamber 7 with less steam than in the first step for a predetermined time, completing the second step. Thereafter, both parallel pipes 11 and 12 are closed by solenoid valves 13 and 14, and motor-driven valve 27 for the heating slurry is opened, pump 28 begins to operate and the slurry is discharged through discharge pipe 29 to the next station.

Figure 13:
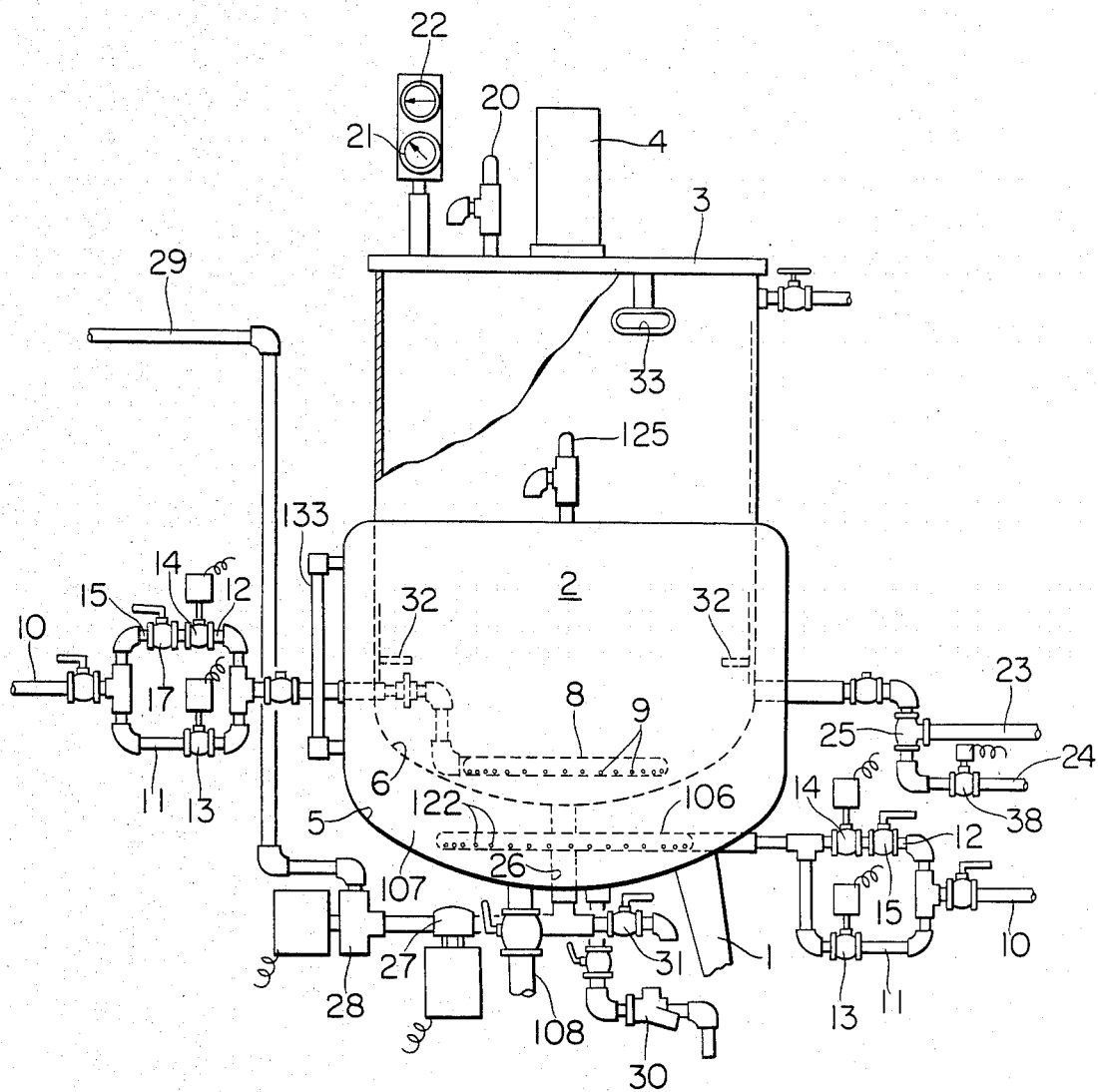
FIG. 13 is a front elevational view, partially in section, of another embodiment of the present invention.

A second embodiment of the present invention is shown in FIG. 13 with the parts corresponding to those in the first embodiment shown in FIGS. 1 to 12 being represented by the similar reference numerals which the latter parts bear.

As apparent from the comparison of FIG. 13 with FIG. 1 the principal differences of the second embodiment from the first one reside in the constitution of a heating chamber 107. That is, in the second embodiment heating chamber 107 contains therein an annular heating steam pipe 106 having a constitution to similar heating steam pipe 8 contained within vessel 2 with a number of steam injection nozzles 122 each directed obliquely downwards, heating steam pipe 106 being adapted to be supplied with steam from steam pipe 10 through parallel connected pipes 11 and 12 as in the first embodiment although in the latter parallel pipes 11 and 12 are adapted to supply the steam directly into heating steam chamber 7. Additionally, in the second embodiment, heating chamber 107 is equipped with a water gauge 133 at its upper portion, and a safety valve 125 is provided on its top wall, a feed water pipe 108 being connected to heating chamber 107 at its bottom so as to be opened therein.

In operation, when valve 38 of steam pipe 24 is opened the steam is fed to ejector 25 so that by the action of ejector 25 the raw slurry is delivered through raw slurry supply pipe 23 into vessel 2. In this state the steam is injected into vessel 2 and heating chamber 107 through heating steam supply pipes 8 and 106 from steam pipes 10, respectively, through parallel pipes 11 and 12 associated therewith. At the same time water is fed into heating chamber 107 through feed water pipe 108 so that heating chamber 107 is filled with hot water as a result of the heating of the feed water by the steam injected therein from heating steam supply pipe 106 through injection nozzles 122. Thus, the raw slurry within vessel 2 becomes well boiled by the steam injected from heating steam supply pipe 8 through injection nozzles 9 as well as the hot water filled in heating chamber 107. Thereafter, the slurry within vessel 2 is steamed mainly indirectly by heating chamber 107. Thus, upon production of the boiled and steamed slurry, it can be discharged from vessel 2 through opened valve 27 and conveyed by pump 28 to the next station via heated slurry discharge pipe 29. If necessary, heating chamber 107 may be heated only by steam without the supply of water through pipe 108.

Thus, in this embodiment, as in the first embodiment, since there is provided a heating chamber 107 around vessel 2 comprising double walls 5, 6, and since heating steam supply pipes 8 and 106 are provided within vessel 2 at its lower portion and heating chamber 107, respectively, and since raw slurry injection pipe 23 opens into vessel 2 and feed water supply pipe 108 is opened into heating chamber 107, heating chamber 107 can be filled with hot water or steam as desired. Therefore, the raw slurry contained within vessel 2 can be boiled by steam directly and/or steam or hot water indirectly, making the boiling of the raw slurry contained within vessel 2 to be regulated and at the same time also allowing the quality of the bean curd to be regulated.

Figure 14:
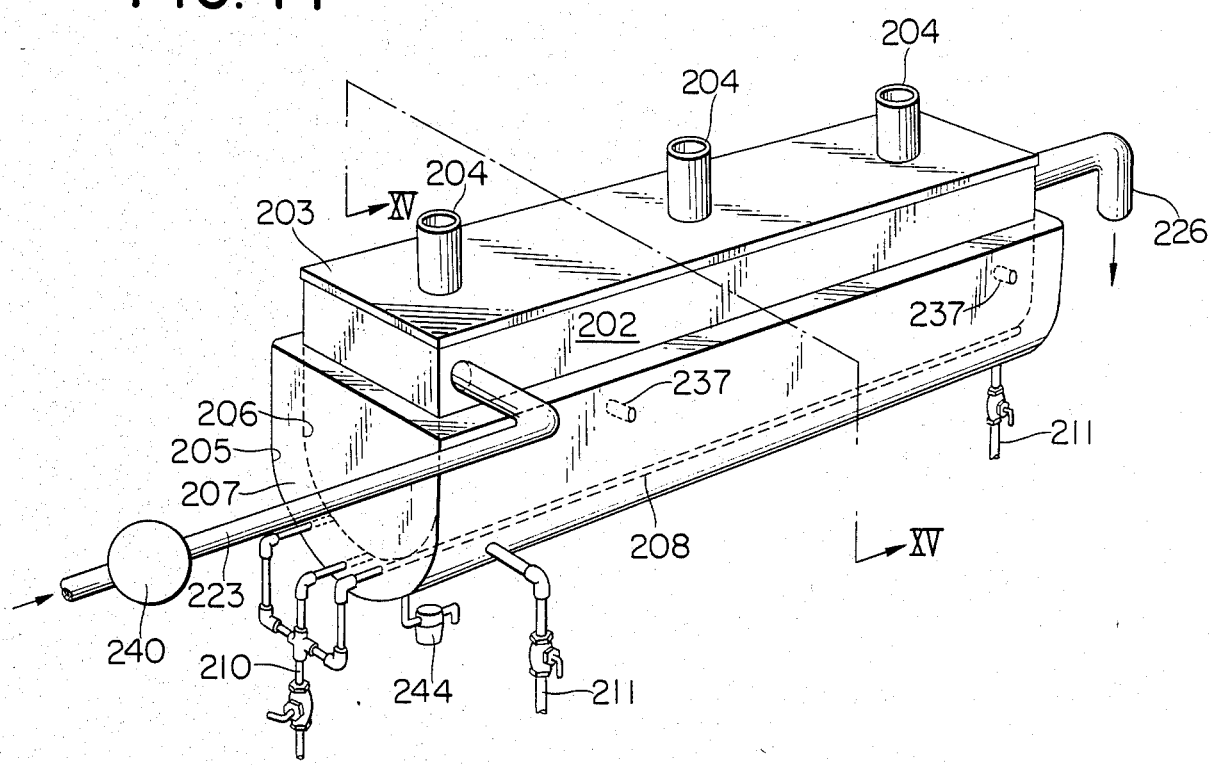
FIG. 14 is a perspective view of a further embodiment of the present invention.
Figure 15:
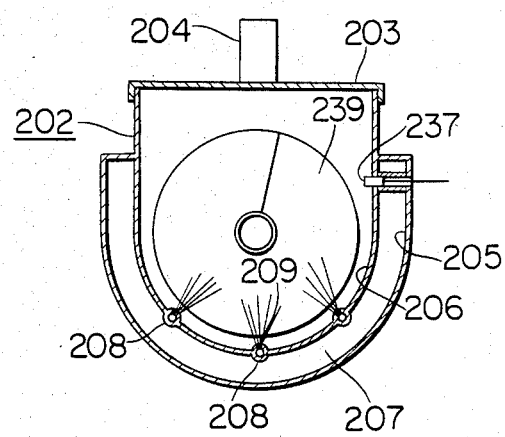
FIG. 15 is a cross sectional view of the apparatus shown in FIG. 14 taken along the line XV—XV of FIG. 14.
Figure 16:
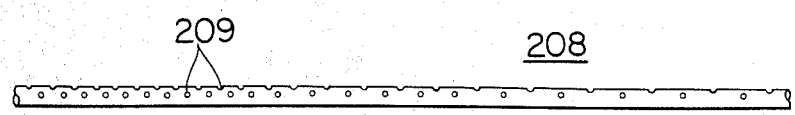
FIG. 16 is a front elevational view of a part of one of the steam injection pipes shown in FIGS. 14 and 15.

A third embodiment of the present invention is illustrated in FIGS. 14 and 15. In this embodiment, as shown in the drawings a horizontal open-topped vessel 202 has generally a round bottomed rectangular shape in cross section and generally a rectangular configuration in plan view with both ends being closed by a pair of opposite end-plates. Vessel 202 is surrounded at its lower part by an outer wall 205 so that it forms a sealed heating chamber 207 around vessel 202. A rotary screw 239 is disposed axially within vessel 202 so that its center axis coincides with the center of the curvature of the rounded bottom of vessel 202. A pump 240 is mounted to one of the end plates of vessel 202 by a pipe 223 to forcedly deliver the raw slurry into vessel 202. A number of pipes 208 are axially secured to the bottom 206 of vessel 202 so as to be fed with steam from a steam pipe 210 through branch pipes, each pipe 208 being provided with a plurality of steam injection nozzles 209 opened into vessel 202, and further steam pipes 211 are opened into heating chamber 207 to fill therein with pressurized steam. As an example, the length of vessel 202 is about 4 m and the raw slurry is fed into vessel 202 at a flow rate of about 10 to 15 m$^3$/min. The boiled slurry is successively transferred from the one end plate side to the other end-plate side of vessel 202 by the rotating screw 239. In this case, as shown in FIG. 16, since each of steam supply pipes 208 are provided with steam injection nozzles 209 such that the distance between adjoining nozzles become greater the nearer they get to the other end-plate of vessel 202 away from the raw slurry inlet end-plate, the amount of steam injected into the slurry becomes smaller as it approaches said other end-plate of vessel 202. Thus the heating of the slurry is converted gradually from the boiling process into the steaming process. The finally heated slurry is continuously discharged from said other end-plate of vessel 202 through a discharge pipe 226 opened thereto by the action of the rotating screw.

Vessel 202 is closed at opened top by a cover 203 which is proviced with a number of opened upstanding cylindrical pipe 204. And further temperature sensors 237 are provided through outer wall 205 and the wall of vessel 202 to detect the temperature of the slurry at different portions, a steam trap 244 being also provided at the lower portion of outer wall 205.

Figure 17:
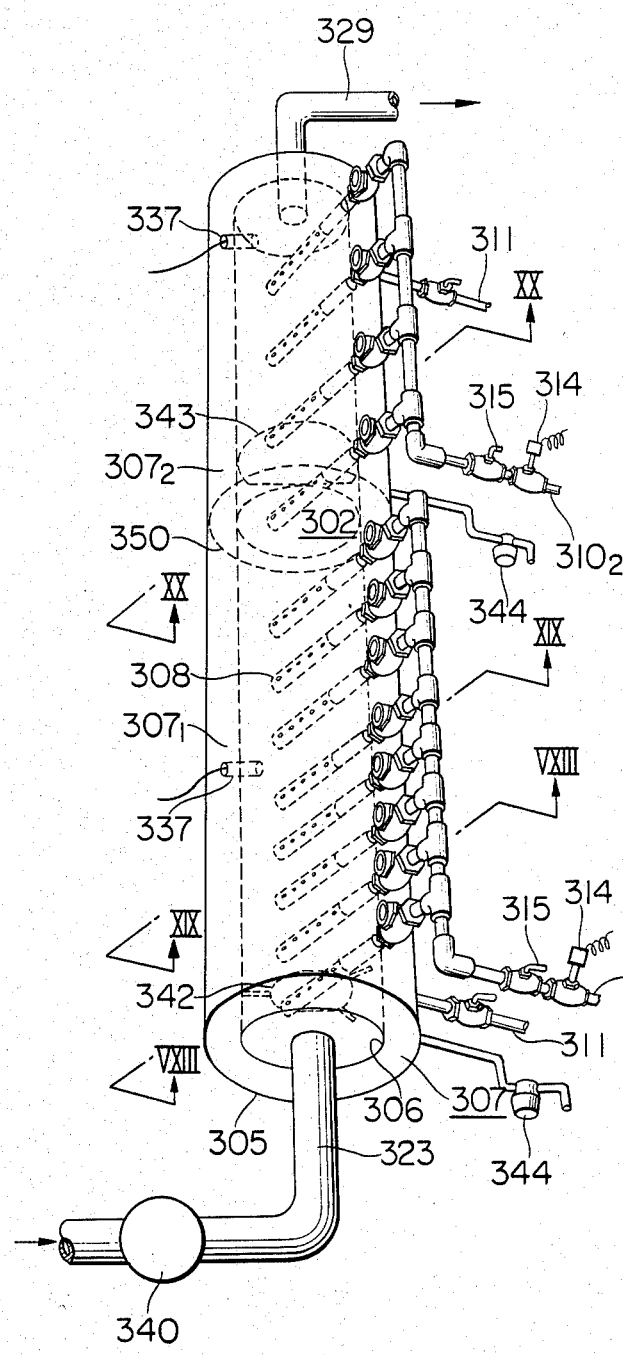
FIG. 17 is a perspective view illustrating a still further embodiment of the present invention, viewing substandially upwards.
Figure 18:
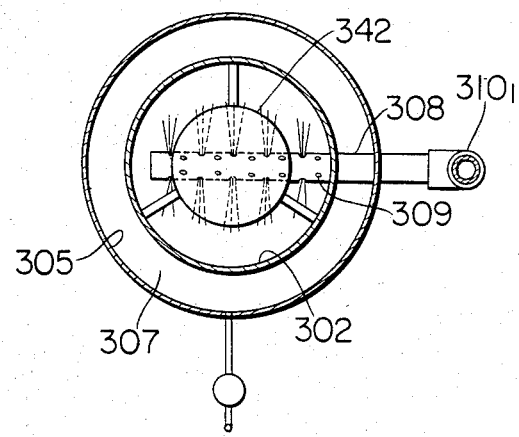
FIG. 18 is a cross sectional view of the apparatus shown in FIG. 17 taken along the line XVIII-VIII of FIG. 17.

Finally a fourth embodiment of the present invention is shown in FIGS. 17 to 20. As shown in FIG. 17 a vertical hollow cylindrical vessel 302 is surrounded by a cylindrical wall 305 so as to form a heating chamber 307 therebetween with both ends sealingly closed by end-plates. Further, heating chamber 307 is separated into two chambers, i.e. a lower and an upper heating chamber $307_1$ and $307_2$, respectively, by a partition wall 350 provided substantially in the upper half of vessel 302. The raw slurry is adapted to be continuously fed into vessel 302 from the lower endplate by a pump 340 through a pipe 323 secured thereto. Steam is adapted to be injected into vessel 302 by a number of steam supply pipes 308 arranged orthogonally to the axis of vessel 302 through a plurality of steam injection nozzles 309 formed around pipes 308, steam supply pipes 308 being divided into two groups so as to be located near lower and upper heating chambers $307_1$, $307_2$, respectively, and each group is adapted to be supplied with steam by a common steam pipe $310_1$ and $310_2$, respectively, each pipe being equipped with a solenoid valve 314 and a manual valve 315. Heating chambers $307_1$, $307_2$ are arranged to be supplied with steam through steam pipes 311, respectively opened into them through outer wall 305. The spaces between adjoining steam supply pipes 308 are such that they are greater in the group near upper heating chamber $307_2$ than those that are in chamber $307_1$. See FIG. 17. Thus, upon supply of the raw slurry from the lower end-plate of vessel 302 through pipe 323 by the action of pump 340, the slurry is forcedly moved upwards, whereby it is heated directly by steam injected from steam supply pipes 308 through injection nozzles 309 as well as indirectly by heating chambers $307_1$, $307_2$. In this case, since the spaces between adjoining steam supply pipes 308 become greater as the slurry approaches the upper end-plate of vessel 302, the amount of the steam injected into the slurry becomes less so that the heating takes place in the form of boiling in the first step and thereafer it is converted from boiling into the form of steaming as the second step. The finally steamed slurry is continuously discharged from a discharge pipe 329 opened to the upper end-plate vessel 302.

Figure 19:
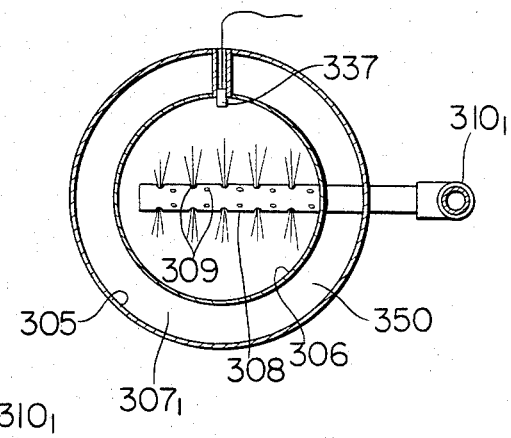
FIG. 19 is a cross sectional view of the apparatus shown in FIG. 17 taken along the line XIX—XIX of FIG. 17.
Figure 20:
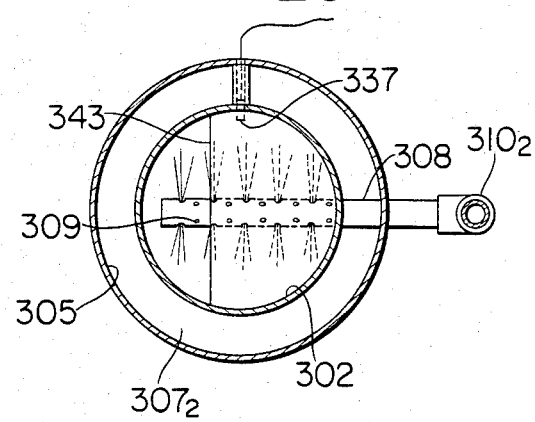
FIG. 20 is a cross sectional view of the apparatus shown in FIG. 17 taken along the line XX—XX of FIG. 17.

It should be noted that as shown in FIG. 17 a circular disc 342 is located within vessel 302 near the lower end-plate to prevent the raw slurry supplied thereinto from directly passing through vessel 302 axially, but instead disperses it radially, and an arcuate disc 343 is located at the upper portion as a baffle to more positively separate the inside of vessel 2 into a boiling zone and a steaming zone. See FIGS. 17 and 20. Also there are provided temperature sensors 337 to detect the temperatures of the slurry at the lower portion or so-called boiling zone and at the upper portion or so-called steaming zone of vessel 2 as shown in FIGS. 17, 19 and 20, and finally there are also steam traps 344 being provided in outer cylinder 305 near the lower end-plate and partition wall 350.

While in the foregoing specification a detailed explanation of certain embodiments of the invention were set forth for the purpose of illustration, it will be understood that many of the details hereingiven may be varied considerably by those skilled in the art without departing from the spirit and scope of the invention.

What is claimed is:

1. An apparatus for heating a bean curd slurry in preparing tofu, comprising a vessel to contain therein said bean curd slurry to be heated, an outer wall substantially sealingly surrounding said vessel with a space being left therebetween to form a heating chamber, a first steam supply means mounted within said vessel for direct introduction of steam into said slurry, a second steam supply means connected to said heating chamber for indirectly heating said slurry, steam control means providing for two stage heating of said slurry under boiling conditions in the first stage and reduced heat steaming in the second stage, said control means including (i) a first heat supply regulating means adapted to regulate the amount of steam to be fed to said first steam supply means, and (ii) a second heat supply regulating means adapted to regulate the amount of steam to be fed to said second steam supply means, and a supply means for said slurry to feed the same into said vessel for said two stage heating.

2. An apparatus for heating bean curd slurry as claimed in claim 1 wherein said first and second steam supply regulating means comprise respectively parallel connected steam pipes in communication with a steam source and said vessel, each pipe being equipped with a solenoid valve, and one of said pipes is further equipped with a manual valve.

3. An apparatus for heating bean curd slurry as claimed in claim 1 wherein said first steam supply means has a form of an annular steam supply ring with a number of steam injecting nozzles each directed obliquely downwards.

4. An apparatus for heating bean curd slurry as claimed in claim 1 wherein said second steam supply means has the form of an annular steam supply ring with a number of steam injecting nozzles each directed obliquely downwards, and said outer wall is provided with a feed water supply pipe to supply water to said heating chamber.

5. An apparatus for heating bean curd slurry as claimed in claim 1 wherein said vessel extends vertically and includes therein a floating disc generally conforming to the inside cross-sectional configuration of said vessel so as to be adapted to float on the surface of said slurry contained therein, whereby the bubbling and spitting of said slurry is suppressed by said disc.

6. An apparatus for heating bean curd slurry as claimed in claim 5 wherein said floating disc comprises a ring-shaped frame and a mesh or a perforated disc secured at its outer periphery to the inner periphery of said frame.

7. An apparatus for heating bean curd slurry as claimed in claim 5 wherein said floating disc comprises an annular disc and a funnel secured at its bottom to the central hole of said disc with the opening being directed upwards.

8. An apparatus for heating bean curd slurry as claimed in claim 1 wherein said vessel has a form of an elongated hollow horizontal vessel with a generally rectangular configuration with a rounded bottom, said vessel being closed at both ends by a pair of opposed end-plates, and wherein said outer wall substantially surrounds the lower part of said vessel, said slurry supply means being connected to one of said end-plates through said outer wall to supply said slurry into said vessel under pump pressure, a slurry discharge pipe being connected to said vessel at the other of said end-plates, and wherein said bottom of said vessel is provided with a plurality of steam injection pipes comprising said first steam supply means, said pipes terminating in injection nozzles and being arranged longitudinally in said vessel, said outer wall being connected to said second steam supply means, and wherein there is contained in said vessel a rotary screw to urge said slurry supplied to said vessel from said one of said end-plates towards said other of said end-plates, the spaces between adjacent injection nozzles being greater near said other of said end-plates than those near said one of said end-plates.

9. An apparatus for heating bean curd slurry as claimed in claim 1 wherein said vessel has a form of an elongated longitudinally-extended cylinder with the ends being closed by a pair of opposed end-plates, and said outer wall substantially surrounding said cylinder coaxial thereto, said slurry supply means being connected to one of said end-plates to supply said slurry into said cylinder, a slurry discharge pipe connected to the other of said end-plates, and a plurality of parallel steam injecting pipes disposed within said cylinder through said outer wall so as to be orthogonal to the center axis of said cylinder such that the spaces between adjoining steam injection pipes are made greater near said one of said end-plates than those nearer said other of said end-plates.

10. An apparatus for heating bean curd slurry as claimed in claim 9 wherein a disc is arranged within said cylinder near said one of said end-plates to disperse said slurry supplied therethrough, and a baffle plate having a semi-circular shape disposed within said cylinder at an intermediate location to separate the inside thereof into a boiling zone and a steaming zone.

11. An apparatus for heating bean curd slurry as claimed in claim 10 wherein said heating chamber is divided into an upper and a lower chamber by a partition wall located adjacent to said baffle plate near the separation of said boiling and steaming zones.

* * * * *